Figure 1:
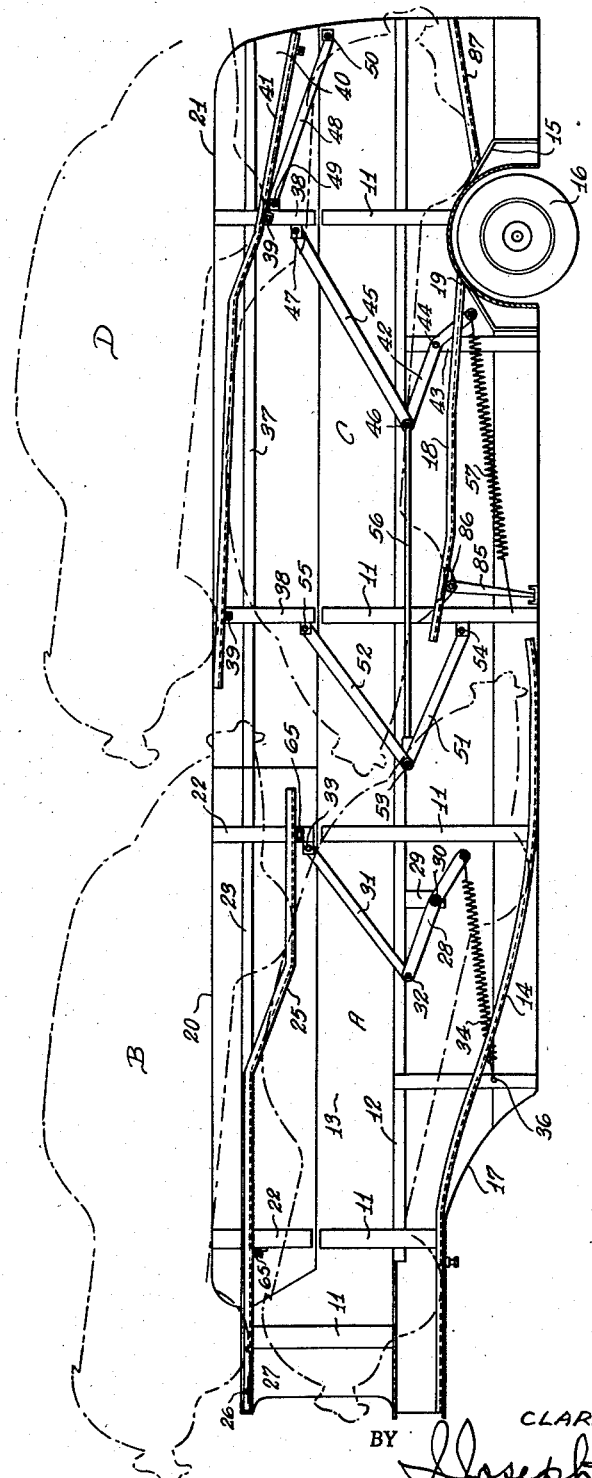

Sept. 18, 1945.  C. C. STUART  2,385,115
HAULAWAY TRAILER CONSTRUCTION
Filed Nov. 27, 1940  4 Sheets-Sheet 1

INVENTOR.
CLARENCE C. STUART
BY Joseph Farley

Sept. 18, 1945.   C. C. STUART   2,385,115
HAULAWAY TRAILER CONSTRUCTION
Filed Nov. 27, 1940   4 Sheets-Sheet 2
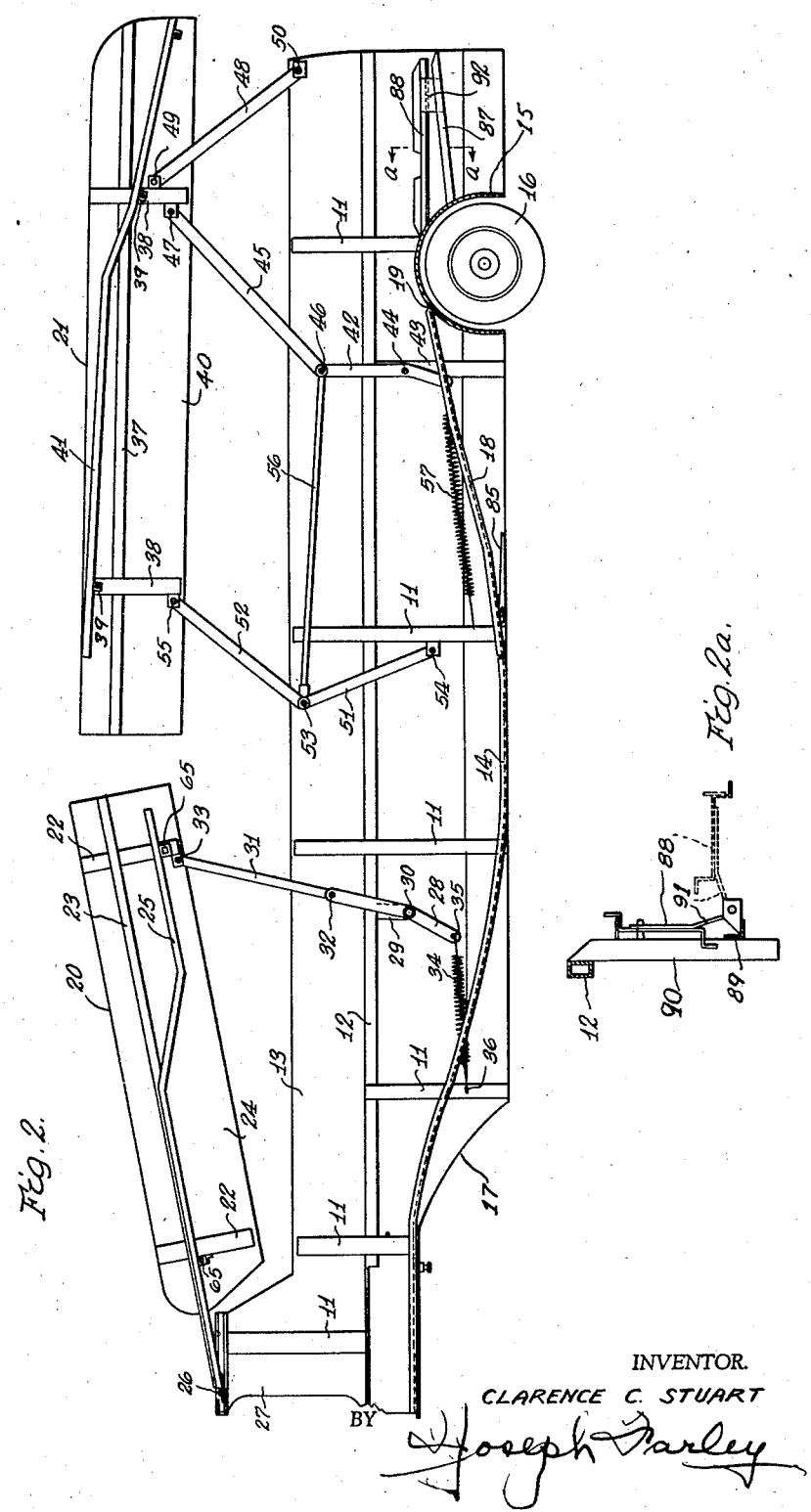
INVENTOR.
CLARENCE C. STUART
BY Joseph Darley Sept. 18, 1945.　　　C. C. STUART　　　2,385,115
HAULAWAY TRAILER CONSTRUCTION
Filed Nov. 27, 1940　　4 Sheets-Sheet 3
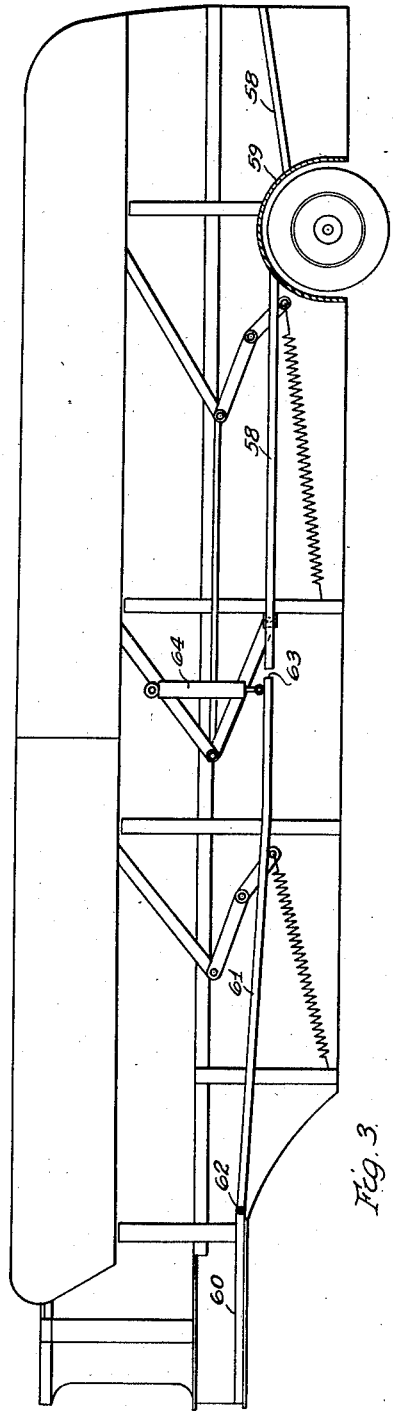
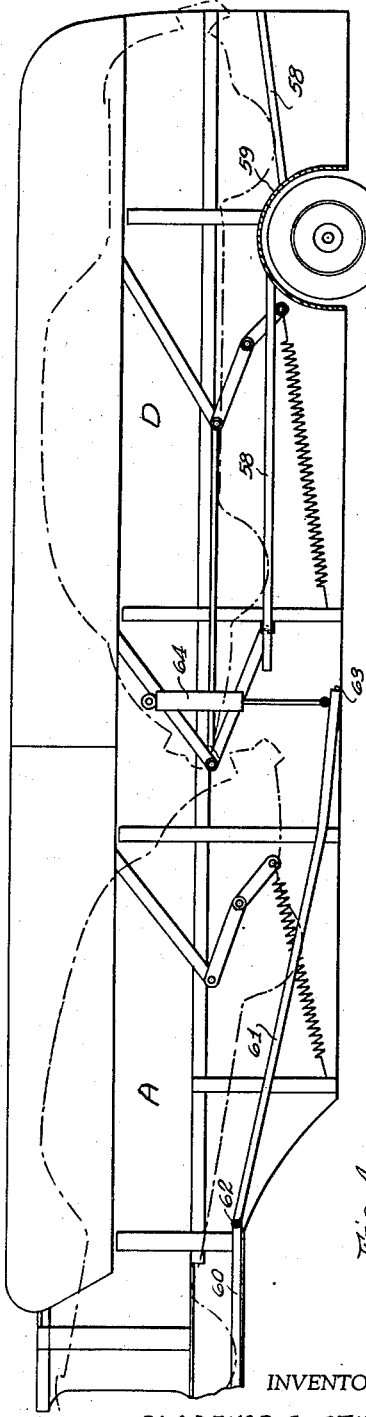
INVENTOR.
CLARENCE C. STUART
BY

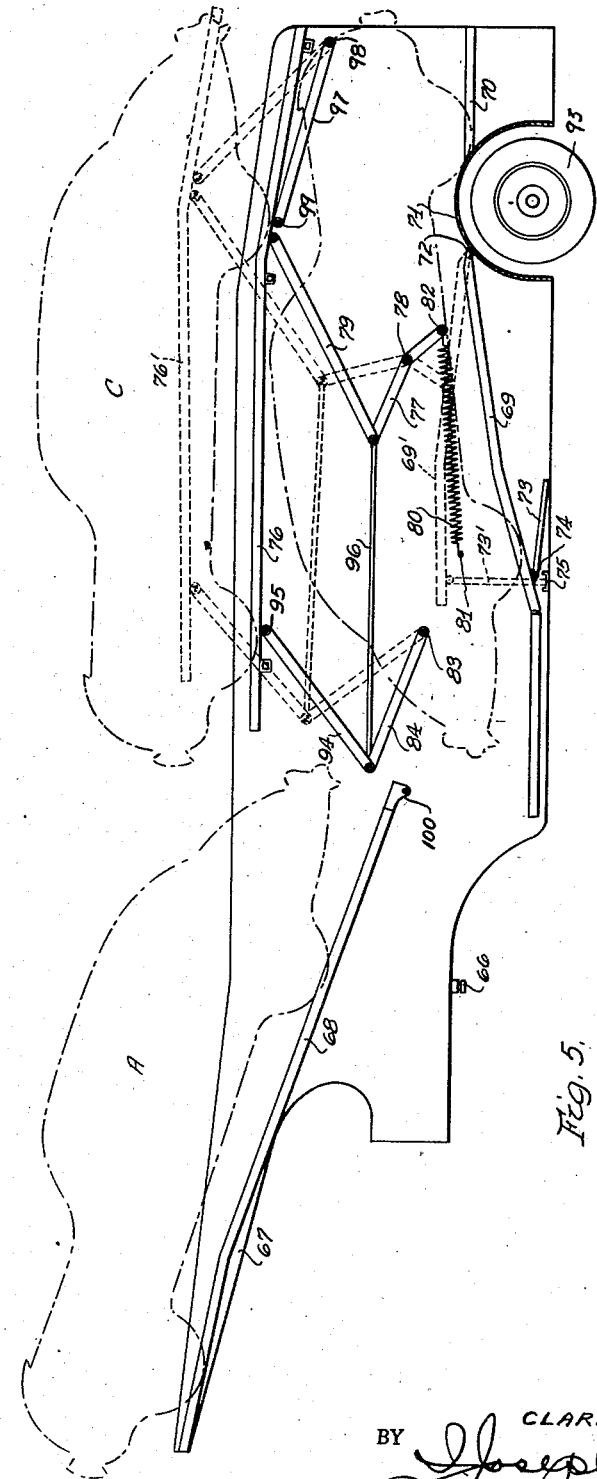

Patented Sept. 18, 1945

2,385,115

UNITED STATES PATENT OFFICE 2,385,115

HAULAWAY TRAILER CONSTRUCTION

Clarence C. Stuart, Pontiac, Mich., assignor to Mechanical Handling Systems, Inc., Detroit, Mich., a corporation of Michigan Application November 27, 1940, Serial No. 367,317

9 Claims. (Cl. 296—1)

This invention relates to an improved form of haulaway trailer for use in the transportation of automobiles.

The problem of designing trailers of this type having a maximum capacity in the number of units which can be handled in one load is dependent chiefly upon laws in effect in practically all States regulating maximum permissible overall length, maximum width and in some instances, overall height of trailers used on the public highways, although this latter factor is also determined by bridge clearances along the principal routes traveled in the transportation of automobiles from the factories to the distributing points. As these State laws are not uniform in their requirements, types of haulway trailers vary in different sections of the country, but one type may become standardized in a given section if the laws of the States involved are analyzed and a design of trailer worked out around the minimum dimensions prescribed by such laws.

The designing of haulaway trailers which meet the requirements of State laws has further been complicated by the recent trend on the part of the automobile manufacturers to make their products wider and longer. With the width of cars formerly manufactured it was standard trailer construction to employ a tandem wheel arrangement, which met State requirements as to the permissible weight which may be carried on a wheel and at the same time permitted the cars to be carried upon the trailer between the wheels thereof, thus effecting a considerable saving in height. The present wider cars, however, cannot be carried upon such a design of trailer because of the fact that the width of the trailer must be increased beyond permissible limits in order to provide for sufficient clearance between the cars carried and the inner sides of the tandem wheel housings; and, therefore, since a tandem wheel trailer no longer offers any advantages in carrying certain of the new makes of cars, the present invention contemplates a return to the simpler dual type of trailer wheels. However, when dual wheels are used in a trailer of legal width, it is inevitable that one of the cars carried must be positioned at a height sufficient to clear the wheel housings of the trailer. If the trailer is of the double-deck type, the height at which the upper car is carried will also be affected, and unless the trailer is designed so that the cars are nested to the greatest possible extent, the overall height of the loaded trailer will be increased beyond permissible limits.

Modern cars generally have longer bodies than their predecessors of recent years, and in addition to an increase in body length, some manufacturers have adopted a construction which results in the bumpers of their cars becoming an integral and necessary part of the body to such an extent that bumpers on these cars cannot be removed during shipment, thus departing from standard practice in this respect and increasing the shipping length by substantially a foot per car. In many cases this means that two cars cannot be carried end to end within an ordinary vehicle of the prescribed length.

In general, the present invention seeks to advance certain principles of haulaway trailer construction by means of which a plurality of cars may be carried within a length less than their combined overall lengths and within a height less than their total overall heights.

Specifically, the present invention is concerned with a trailer having an overall length of less than 33 feet which is capable of carrying four of the modern wider cars within a road clearance of 13 feet, 6 inches, and also with a trailer capable of carrying three modern-type cars within an overall length of 35 feet, this dimension including the length of the tractor which connects to the trailer. It has been found possible to attain these objects by the use of movable upper sections of the trailer upon which cars are supported, in combination with a certain sequence of loading so that when the trailer is fully loaded all cars will be nested together to the greatset possible extent in order to conserve space.

Among the incidental objects of the invention are: first, the teaching of the use of a plurality of independently movable upper sections on a haulaway trailer as an aid to the loading of a maximum number of cars in a minimum amount of space; second, the use of means for causing the movement of these sections such as will be simple and economical of manufacture and easily operated after the trailer is in use; and third, the use of movable lower tracks, or runways upon which the cars are supported, in combination with the movable upper sections for the attainment of the principal object above set forth.

The accompanying drawings schematically show preferred embodiments of the invention by a series of sectional elevations taken along the longitudinal center line of a trailer. In all cases minor constructional details, such as would be well known to those familiar with the construction of trailer bodies, are omitted and it is intended that the structure shown in the various views of half of a trailer be duplicated to form the other half of a complete unit. These various views comprise:

Fig. 1, showing a trailer of the present invention with its essential component parts in the positions they occupy when the trailer is fully loaded and showing in dotted lines the outlines of the automobiles in the relative position occupied by each in comprising that load;

Fig. 2, showing the trailer of Fig. 1 unloaded but with its essential component parts in the positions they occupy just before the loading begins;

Fig. 2a, a small sectional view along the line a—a of Fig. 2, showing details of certain auxiliary runway construction;

Fig. 3, showing an alternate form of movable lower runway;

Fig. 4, showing the operation of this runway when the trailer is loaded. In the trailer of Figs. 3 and 4, the design of upper movable sections is in all respects similar to that shown by Figs. 1 and 2; and, Fig. 5, showing the adaptation of the principles of this invention to a smaller trailer capable of hauling three cars.

By reference to Fig. 2, it can be seen that a trailer constructed on the principles of the present invention consists of a suitable framework composed of a plurality of vertical members 11 connected by one or more horizontal members such as the member 12 shown. Sheet metal work 13 is attached to this framework and forms the outer surface of the trailer, including the sides and bottom. Lower tracks or runways 14 are supported from this framework adjacent each side of the trailer and are positioned so as to receive the wheels of the cars to be carried. Because of the fact that a housing 15 must be provided for the wheel 16 at the rear of the trailer and the front portion 17 of the trailer must be cut away to allow clearance for the rear wheels of the tractor, it is impossible to permanently place the runways 14 in a uniformly horizontal position if the available storage space is to be utilized to the fullest extent. Consequently, the central portion of the runway 14 is brought down to the bottom of the trailer. One section of this runway, the section 18 extending from the wheel housing 15 to approximately the midpoint of the trailer of Figs. 1 and 2, is hinged at its rearmost point 19 and may be swung upwardly about this point. This pivoted section permits overlapping or nesting of the cars which are carried in the lower deck of the trailer, as will be more fully set forth when the method of loading the cars is described. Without this overlapping, it would be impossible to carry two of the larger, longer wheelbase makes of cars within a 33-foot overall length. A prop member 85 is pivotally secured to the underside of the section 18 adjacent its free end by a suitable hinge 86 so that this prop member serves to retain the section 18 in an elevated position, as shown in Fig. 1.

Rearward of the wheel housing 15 the lower runway consists of a short section 87 which will always support one pair of wheels of the second or rearward car carried in the lower deck, and hence the end of this section 87 adjacent the wheel housing 15 is located at as low a point as is possible in order that the rearward car may be carried low in the trailer body. From this low point at the wheel housing the section 87 slopes upwardly to the rear so as to act in the manner of a chock in aiding in retaining the loaded car in position. Because of the low location of the section 87 next to the wheel housing 15, there is a danger that the underbody of a car being driven to the forward portion of the lower deck would not clear the housing, and therefore an auxiliary runway 88 is provided so as to extend rearwardly above the section 87, at approximately the height of the housing 15. As can be seen from Fig. 2a, the runway 88 is mounted from a bracket 89 connected to the side structure 90 of the trailer by a hinge 91, so that when the runway 88 has served its purpose as an aid to the loading of the cars it may be folded against the side of the trailer body. It is supported in a horizontal position between the housing 15 and a removable block 92 which is placed upon the section 87.

The upper deck of the trailer is composed of two movable sections, a forward section 20 and a rearward section 21. The forward section 20 consists of suitable vertical and horizontal frame members 22 and 23 respectively to which transverse members 65 are connected. Sheet metal side plates 24 are mounted upon this framework, and are cut so as to be contiguous to the sheet metal work 13 of the main body of the trailer when the section 20 is in its lowered position. Runways 25 are firmly secured to the framework of this section, as the entire section pivots about the forward ends of these runways by means of a hinge 26 attached to the end of each runway and to the stationary upper forward part 27 of the main body. Raising and lowering of this section is accomplished by a linkage consisting of a bell crank 28, which is pivotally mounted upon a frame member 29 of the trailer body at a point 30, and a link 31 having its lower end connected to the bell crank 28 by a pivot pin 32, and its upper end secured to the frame structure of the upper section 20 by a pivot pin 33. By means of this linkage, it can be seen that if force is applied to the lower arm of the bell crank so as to cause rotation thereof in a clockwise direction, the free end of the section 20 will be made to move upwardly. Hence, one end of a large spring 34 is connected to the bell crank 28 at a point 35 and the other end of this spring is anchored to the frame at 36 so that the spring normally exerts a force upon the bell crank tending to raise the upper section. The extent of the force so exerted, however, is not sufficient to actually cause movement of the upper section 20, but in this respect the spring acts similar to a counterbalance so that the sections may readily be manually raised by lifting upwardly thereon. Suitable means are provided for locking the section in its upper and lower positions.

The construction of the rear section 21 is similar to that of the main body of the trailer and that of forward section 20 just described, there being the horizontal and vertical frame members 37 and 38 respectively, transverse members 39, and sheet metal sides 40. Runways 41 are mounted upon this structure. In contrast to the arcuate upward motion of the forward section 20, the rear section 21 is designed to move bodily upward in substantial parallelism with the stationary lower structure of the trailer. This motion is accomplished by a linkage which may be described as follows: upward motion of the rear portion of the section is defined by a linkage similar to that already used and described for the forward section 20, it being comprised of a bell crank 42 pivotally secured to the frame member 43 by a pin 44 and a link 45 having one end connected to the upper arm of the bell crank 42 by a pivot pin 46 and its other end pivotally secured to the frame structure of the upper section by a pin 47. A second link 48 is used to impart additional transverse stability when the section 21 is in its raised position, this link 48 being positioned rearwardly of the aforementioned bell crank linkage and is pivotally secured to the structure of the section 21 and the main body of the trailer by pins 49 and 50 respectively. Motion of the bell crank 42 and link 45 accompanying upward movement of the rear portion of the section 21 is used to produce a simultaneous upward movement of the forward portion of this section by means of a toggle consisting of links 51 and 52 pivotally connected together by a pin 53, the other end of the link 51 being pivotally secured to the framework of the trailer body by a pin 54 and the other end of the link 52 being similarly secured to the structure of the section 21 by a pin 55. The toggle formed by this combination of links 51 and 52 is actuated by a bar 56 connected to the upper arm of the bell crank 42 at its intersection with the link 45 by the pin 46 and connected to the junction of the links 51 and 52 by the pin 53.

If a force is applied to the lower arm of the bell crank 42 sufficient to cause a clockwise rotation thereof, the rear portion of the section 20 will be raised by the action of the link 45 and at the same time the forward portion will also be raised by the toggle action of the links 51 and 52 caused by the rearward motion of the bar 56. It is to be noted that the entire linkage system has been designed so that the movement of the section 21 has a rearward as well as an upward component. The reason for this will be more readily apparent when the method and sequence of loading the cars upon the trailer is explained. As was the case with the forward section 20, a large spring 57 is interposed between the lower arm of the bell crank 42 and the trailer framework so as to exert a normal lifting force or counterbalancing effect to facilitate the raising of the section 21. Locking means will also be used to retain the section 21 in its upper and lower positions.

The manner in which the trailer is loaded may be explained by reference to Figs. 1 and 2. Before any cars are placed upon the trailer the upper sections 20 and 21 are moved to their raised position, shown in Fig. 2, the pivoted section 18 of the lower runway is lowered into alignment with the stationary runway 14 and the auxiliary runway 88 is swung down from the side of the trailer to a substantially horizontal position. The forward car of the lower tier, marked "A" in Fig. 1, is the first to be loaded. When this car is in place, the forward upper section 20 is lowered to its horizontal position and car B, the front car of the upper tier, is the second to be loaded. Car B is placed in position with the aid of ramps which are temporarily secured to the rear ends of the runways 25 and lead downward to a point in the vicinity of the wheel housing 15 so as to give a suitable angle of approach. If the angle is made steeper, the running boards of the car will not clear the intersection of the runway 25 and the top of the ramp, while if a more acute angle is used, clearance will be lacking between the roof of car B and the runways 41 of the rearward upper section 21.

The third car to be loaded, car C, is the rear car of the lower tier. In order that it will overlap car A as much as possible, the pivoted section 18 of the runway is raised to the position shown in Fig. 1 where it is held in place by the prop member 85, and in order that car C will ride as low as possible the auxiliary runway 88 is folded to its inoperative position against the side of the trailer. After car C is in place, the rearward upper section is lowered and locked in horizontal position and the fourth car, D, is driven thereon with the aid of ramps. As each car is placed in its respective position on the trailer, it is snubbed down with one of the forms of holding devices now in general use for the purposes of preventing horizontal and vertical movement of the car; of compressing the car springs so as to reduce its overall height and thus give greater clearance between the upper and lower tiers; and also of reducing the overall height of the loaded trailer. It is to be noted the loading of car C differs from that of the other cars since the front end of car C faces towards the rear of the trailer. This position of car C permits a saving in the overall height of the loaded trailer by enabling the rear end of car D to be carried at a lower height.

Figs. 3 and 4 illustrate an alternate form of runway which may be employed in place of the lower runway used in the trailers of Figs. 1 and 2. Aside from the difference in the form of runway, however, the trailer of Figs. 3 and 4 is identical to that of Figs. 1 and 2, so that the foregoing description of constructional details and sequences of loading remains applicable. Therefore, the discussion of the trailer of Figs. 3 and 4 will be confined to the construction and method of operation of this alternate form of runway.

This runway consists of a stationary track 58 extending along the rear portion of the trailer at approximately the height of the wheel housing 59. A short length of track 60 at the front part of the trailer is also stationary. The intermediate section 61 is connected to the track 60 by a hinge joint 62 so that the free end 63 may be lowered. With the section 61 in alignment with the section 58 as shown in Fig. 3 the first car A is driven into position and the section 61 is then lowered with the aid of a lifting device such as the hydraulic jack 64, so that when the last car D is finally loaded the cars A and D will overlap as shown by Fig. 4.

While the same results, as far as the relative positions of the loaded cars are concerned, are obtained in each case, the previously described construction illustrated in Figs. 1 and 2 is preferred because no auxiliary equipment such as the hydraulic jack 64 is needed in moving the pivoted runway section 18 from its lower position to its raised position or vice versa, but such movement may always take place when the section 18 is not occupied by the car which it is designed to support.

Fig. 5 illustrates a further design of trailer embodying the principles of this invention. In some States the laws governing the dimensions of vehicles used by motor carriers limit the overall length of such vehicle to within 35 feet, which dimension includes the combined length of the tractor and trailer if this type of vehicle is used. When such a limitation is imposed upon a vehicle used for transporting automobiles, it becomes impossible to produce a trailer which is capable of carrying four cars within the prescribed limitations on overall height such as the type of trailer previously described and discussed. It has been found that three cars is the maximum number that can be loaded within a 35-foot length and with the larger makes of cars even this cannot be accomplished unless the trailer is designed so that a certain amount of overlapping between the cars takes place when they are in their loaded position.

The showing of Fig. 5 is of the diagrammatic half-sectional type previously used. The trailer body consists of a suitable framework and sheet metal outer surface and is open at the top. In operation the rear end of the trailer is supported upon a suitable wheel and axle assembly indicated by the reference 93, while the front end is attached to the tractor by any of the available forms of trailer hitches, such as is indicated by the member 66. A portion 67 of the upper part of the forward end of the trailer is designed to overhang the cab of the tractor and a runway 68 extends from the forward part of this portion rearwardly and downwardly into the body of the trailer. Through this overhanging design it becomes possible to utilize all available length, but it must be remembered that the one limitation upon the use of such an overhang is that the trailer must be designed for use with one particular type of tractor in order that sufficient clearance will be provided between the top of the cab of such tractor and the lower part of this overhanging portion to allow for all ordinary unevenness in road surfaces. The lower runway used in this trailer is similar to that employed in the four-car trailer shown in Figs. 1 and 2 and consists of a pivoted section 69, which has a forward and downward configuration, and a short stationary section 70 located to the rear of the wheel housing 71. A suitable hinge 72 is employed for securing the rearward end of the section 69 to a point on the forward curve of the wheel housing 71. The pivoted section 69 is held in its upper position indicated in dotted lines and by the reference 69', by a prop member 73 pivotally secured to its under surface by a suitable hinge 74. When the section 69 is in the position 69' the prop member 73 is placed in a vertical position as shown by the reference 73' and is retained in this position by having its lower end located between the upwardly projecting flanges of a channel section 75 or other suitable retaining member of this type.

A third runway section 76 is provided along the upper portion of the rearward part of the trailer and means consisting of a linkage identical to that previously described in connection with the four-car trailer of Figs. 1 and 2 are provided whereby this entire section may be moved upwardly and rearwardly to facilitate the loading of the cars. Thus, this linkage is composed of an actuating bell crank 77 pivotally secured to the trailer body by a pivot pin 78, and a connecting link 79 is interposed between the upper end of this bell crank 77 and the runway section 76 so that the rear portion of the runway section will be moved upwardly by a clockwise rotation of the bell crank which is assisted by a spring 80 connected at some point 81 on the trailer body and by a pin 82 to the lower end of the bell crank 77. A toggle is provided to cause upward movement of the forward portion of the runway section 76, this toggle consisting of a lower link 84 pivotally anchored to the trailer body at a point 83, and an upper link 94 anchored to the forward portion of the runway section 76 at a point 95. This toggle is caused to function simultaneously with the movement of the previously described bell crank linkage by the provision of a bar 96 interposed between the junction of the toggle links 84 and 94 and the junction of the bell crank 77 and its upper link 79. The upward movement of the runway section 76 caused by the above-described linkage is defined by a separate link 97 pivotally secured to the trailer body at 98 and to the rear portion of the runway section 76 by a pivotal connection 99.

As was the case with the previously described constructions, the spring 80 is employed to give a counterbalancing effect so that the runway section 76 may readily be manually lifted to its raised position, which is indicated in dotted lines and by the reference 76'.

In the loading of the cars the pivotally mounted lower section 69 is raised to its upper position 69' and the runway section 76 is moved to its elevated position 76'. Auxiliary sections are then securely connected to the rear of the runway 68 with the aid of a fitting 100 provided thereon for this purpose, these auxiliary sections connecting the runway 68 to the forward end of the pivoted section 69'. Car A is then driven onto the runway 68 and is securely snubbed in position. The auxiliary runway sections are then removed and the pivoted section 69 placed in its lower or normal position. Car B is then backed into place. Then the upper runway section 76 may be lowered and car C driven thereon with the aid of ramps.

It is to be noted that alternate principles of construction are illustrated in the four-car trailer and the three-car trailer, particularly in respect to the design of the upper rear runway section but also in respect to the design of upwardly movable runway sections in general. In the four-car trailer the complete upper portion of the trailer body structure was designed so as to be upwardly movable while in the three-car trailer the entire body structure is unitary and the actual runway alone moves upwardly.

Although each type of construction has certain advantages and disadvantages, either type may be used in trailers constructed in accordance with the principles of this invention. Generally it may be said the upwardly-movable body and runway construction of Figs. 1 and 2 offers greater structural advantages but at a higher manufacturing cost than the upwardly movable runway alone of Fig. 5.

As haulaway trailers must frequently be designed specially for certain makes of cars and changed from year to year in accordance with changes in those makes of cars, many designs of trailers have necessarily resulted in the past and will be developed in the future. Therefore, as far as is consistent with the scope of the following claims, it is intended that the description of the invention herein be merely illustrative of the principles involved and not as limiting the invention to any particular design.

I claim:

1. A conveyance for the transporting of vehicles having upper and lower decks upon which said vehicles are supported, characterized by means whereby a plurality of vehicles may be simultaneously carried upon each of said upper and lower decks within a length less than the combined overall length of said vehicles carried, said means comprising a plurality of movable upper vehicle-carrying sections, each of said sections being adapted to support one vehicle, a plurality of lower vehicle-carrying sections, the forward portion of the rearward upper and lower vehicle-carrying sections being located at a greater height than the rearward portion of such sections when the vehicles carried by said conveyance are in loaded position whereby each vehicle may overlap the adjacent vehicle on the same deck.

2. A conveyance of the type wherein a plurality of vehicles are transported in superimposed relationship, said conveyance having a unitary frame structure, characterized by a lower track section and a sectional upper track section comprising a front section and a rear section, said upper front section being positioned adjacent to said upper rear track section, supporting wheels carried by said frame structure and a wheel housing therefor, said upper rear track section being movable upwardly to provide clearance for the passage of a vehicle over said housing in loading and unloading, means for connecting said lower track section with said upper front track section to form a continuous runway upon which a vehicle in loading and unloading said conveyance may be traversed between said lower track section and said upper front track section through the clearance space provided between the upper front and upper rear track sections when the latter is raised to its fully elevated position, and said upper front track section being movable to provide clearance in loading a vehicle on the front portion of said lower track section.

3. A conveyance of the type wherein a plurality of vehicles are transported in superimposed relationship, characterized by a supporting framework, supporting wheels carried thereby, and a housing for said supporting wheels, vehicle supporting runways comprising a front section and rear upper and lower movable sections, means for independently moving said rear upper and lower sections to an inoperative position to provide clearance for loading and unloading said front section and for moving said sections to an operative position for transporting said vehicles on said conveyance, and means for locking said track sections in operative position.

4. A conveyance of the type wherein a plurality of vehicles are transported in superimposed relationship comprising a plurality of independent track sections each of such length as to support a single vehicle to be carried and consisting of a stationary front section and a movable upper and lower rear sections, means for moving said rear upper section substantially vertically to provide clearance for the loading of a vehicle over said movable rear section to and from said stationary front section, and means for moving said lower movable rear section towards and from a position substantially in horizontal alignment with said stationary front section.

5. A conveyance of the type wherein a plurality of vehicles are transported in superimposed relationship, said conveyance having a supporting framework, characterized by a lower track section and a sectional upper track section comprising a front section and a rear section, supporting wheels carried by said framework and a wheel housing therefor, said upper rear track section being movable upwardly to provide clearance for the passage of a vehicle over said housing in loading and unloading, and means for connecting said lower track section with said upper front track section to form a continuous runway upon which a vehicle in loading and unloading said conveyance may be traversed between said lower track section and said upper front track section through the clearance space provided between the upper front and upper rear track sections when the latter is raised to its fully elevated position, and said upper front track section being movable to provide clearance in loading a vehicle on the front portion of said lower track section.

6. A conveyance of the type wherein a plurality of vehicles are transported in superimposed relationship, said conveyance having a supporting framework, a lower track section and a sectional upper track section carried by said framework, said lower track section comprising front and rear portions, said sectional upper track section comprising a front section and a rear section, supporting wheels carried by said framework and a wheel housing therefor, said upper rear track section being movable upwardly to provide clearance for the passage of a vehicle over said housing in loading and unloading, means for connecting said lower track section with said upper front track section to form a continuous runway upon which a vehicle in loading and unloading said conveyance may be traversed between said lower track section and said upper front track section through the clearance space provided between the upper front and upper rear track sections when the latter is raised to its fully elevated position, said upper front track section being movable to provide clearance in loading a vehicle on said front portion of said lower track section, and means whereby said front and rear portions of said lower track section may be moved out of horizontal alignment.

7. A conveyance for the transporting of vehicles having upper and lower decks upon which said vehicles are supported, characterized by means whereby a plurality of vehicles may be simultaneously carried upon each of said upper and lower decks within a length less than the combined overall length of said vehicles carried, said means comprising a plurality of movable upper vehicle-carrying sections, each of said sections being adapted to support one vehicle, a plurality of lower vehicle-carrying sections, the adjacent portions of each of said upper vehicle-carrying sections and each of said lower vehicle-carrying sections being positioned at different horizontal levels when the vehicles carried thereby are in loaded position whereby each vehicle may overlap the adjacent vehicle on the same deck.

8. A conveyance for transporting vehicles, comprising: a unitary frame structure; upper and lower vehicle-carrying sections carried by said unitary frame structure; means for elevating said upper vehicle-carrying section relative to said lower vehicle-carrying section to facilitate the loading of said lower vehicle-carrying section; stationary runway means on said lower vehicle-carrying section for supporting a vehicle and additional runway means on said lower vehicle-carrying section for supporting a second vehicle including a runway portion which when occupied by said second vehicle is out of alignment with said stationary runway means, but which is displaceable when unoccupied into an aligned position with said stationary runway means to allow passage of a vehicle thereover onto said stationary runway means, said displaceable runway portion in its vehicle-supporting position terminating above the adjacent end of said stationary runway means to thereby enable the vehicle supported thereon to substantially overlap the vehicle supported on said stationary runway means.

9. A conveyance for transporting vehicles, comprising: a unitary frame structure; upper and lower vehicle-carrying sections carried by said unitary frame structure; means for elevating said upper vehicle-carrying section relative to said lower vehicle-carrying section to facilitate the loading of said lower vehicle-carrying section; and means on said vehicle-carrying sections for simultaneously supporting a plurality of vehicles within a length less than the sum of the individual overall lengths of said vehicles, said latter means comprising a plurality of sets of vehicle runways associated with each of said vehicle-carrying sections, each set of vehicle runways being adapted to support one vehicle, whereby each vehicle-carrying section can carry a plurality of vehicles at substantially the same level, portions of said sets of runways being movably mounted so that the adjacent ends of the runways of said lower vehicle-carrying section may be located at substantially the same level to allow loading of a vehicle over one set of said runways onto the adjacent set of runways, said adjacent ends being movable from said first-mentioned position to a position to allow subsequent positioning of a vehicle on said last-mentioned runway to overlap the end portion of said first-mentioned vehicle.

CLARENCE C. STUART.